(12) United States Patent
Mennenga

(10) Patent No.: US 8,087,596 B2
(45) Date of Patent: Jan. 3, 2012

(54) DEVICE AND METHOD FOR METERING MEDIA

(75) Inventor: Heyo Mennenga, Rostock-Diedrichshagen (DE)

(73) Assignee: Sartorius Stedim Biotech GmbH (DE)

( * ) Notice: Subject to any disclaimer, the term of this patent is extended or adjusted under 35 U.S.C. 154(b) by 407 days.

(21) Appl. No.: 12/311,809

(22) PCT Filed: Nov. 2, 2007

(86) PCT No.: PCT/EP2007/009504
§ 371 (c)(1),
(2), (4) Date: Apr. 14, 2009

(87) PCT Pub. No.: WO2008/061614
PCT Pub. Date: May 29, 2008

(65) Prior Publication Data
US 2010/0175774 A1    Jul. 15, 2010

(30) Foreign Application Priority Data

Nov. 21, 2006 (DE) .......................... 10 2006 054 606

(51) Int. Cl.
*B05B 9/00* (2006.01)
(52) U.S. Cl. .......................... 239/379; 239/127; 141/234
(58) Field of Classification Search .................. 141/234, 141/237, 10, 18, 83, 94; 239/124, 127, 67–69, 239/11, 379
See application file for complete search history.

(56) References Cited

U.S. PATENT DOCUMENTS

| 1,657,792 | A |   | 1/1928 | Drees et al. |
| 3,893,625 | A | * | 7/1975 | Wiggins .......................... 239/127 |
| 5,224,526 | A |   | 7/1993 | Mette et al. |
| 5,584,327 | A | * | 12/1996 | Thomas et al. ................ 141/104 |
| 6,378,575 | B1 | * | 4/2002 | Marchau ........................ 141/234 |

FOREIGN PATENT DOCUMENTS

| DE | 27 13 525 | 9/1978 |
| DE | 32 45 594 | 6/1984 |
| FR | 1 534 009 | 7/1968 |

* cited by examiner

*Primary Examiner* — Davis Hwu
(74) *Attorney, Agent, or Firm* — Gerald E. Hespos; Michael J. Porco

(57) ABSTRACT

The invention relates to a device (1) for metering media (2) and comprises at least one storage vessel (3), a measuring vessel (14) and a target vessel (14) that are interconnected to give one unit. By the exertion of force on the media (2) to be metered they can communicate between the storage vessel (3) and the measuring vessel (4) and can then be transferred to the target vessel (14). The metering volume is determined by the geometry of the measuring vessel (4). The target vessel (14) can be separated from the measuring vessel (4) by severing (welding, gluing, cutting) the connection between (14) and (4). The invention also relates to a method for metering media using the device (1) according to the invention. The device is suitable as a disposable unit and for the sterile metering of media in a non-sterile environment.

46 Claims, 10 Drawing Sheets

Fig. 1
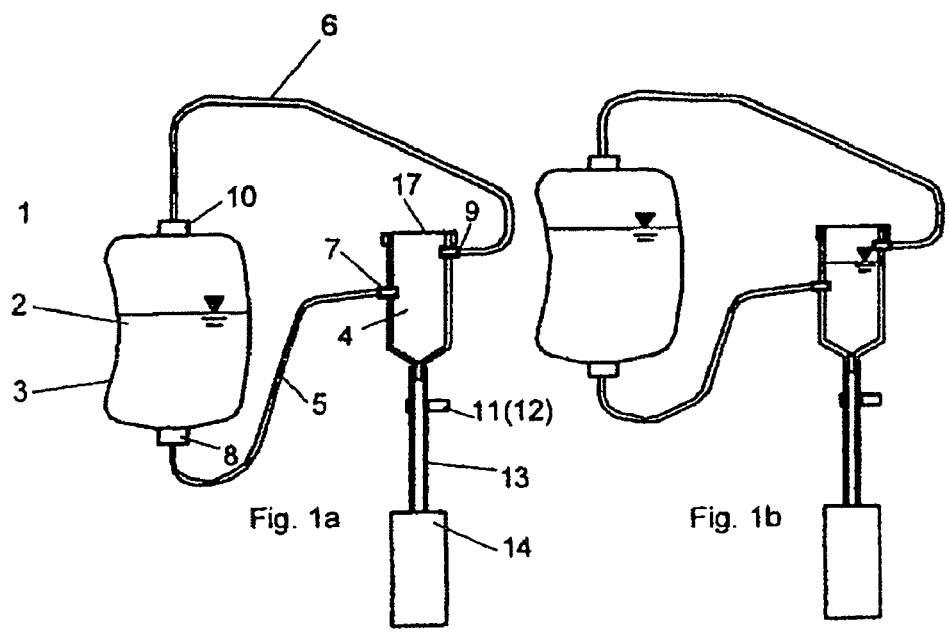
Fig. 1a    Fig. 1b
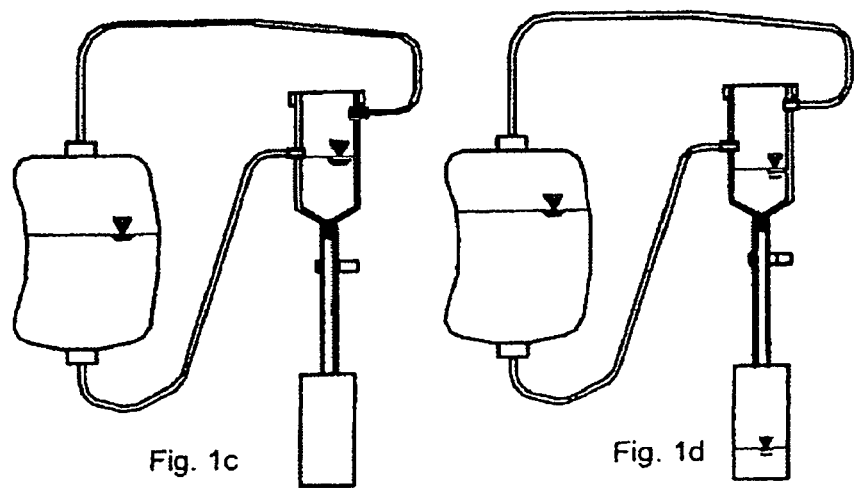
Fig. 1c    Fig. 1d

Fig. 2
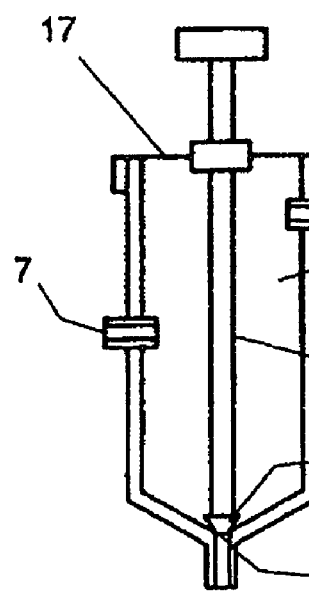
Fig. 2a
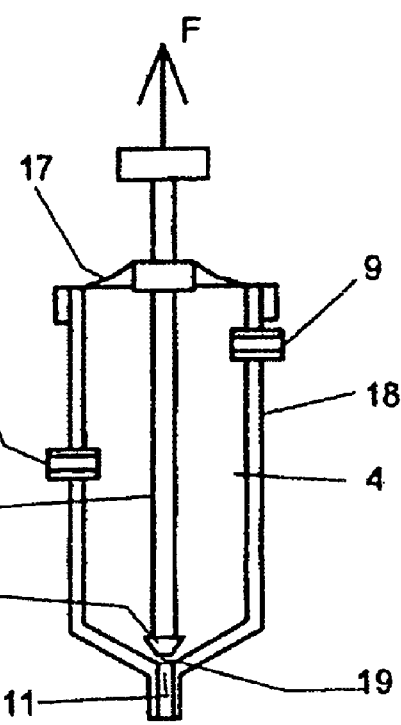
Fig. 2b
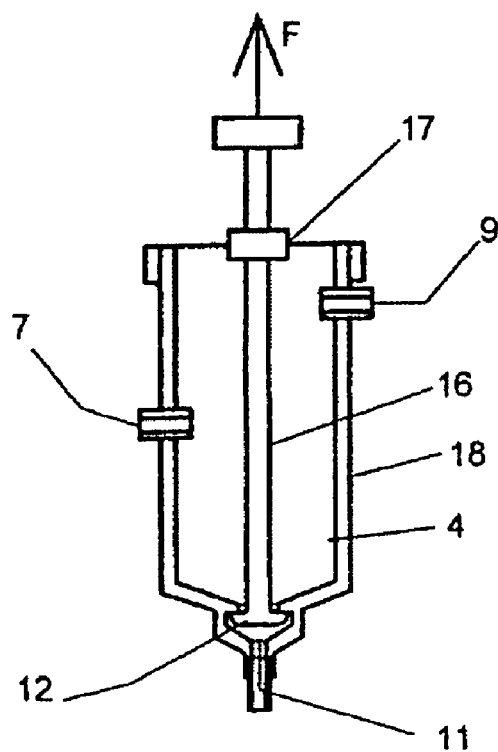
Fig. 2c

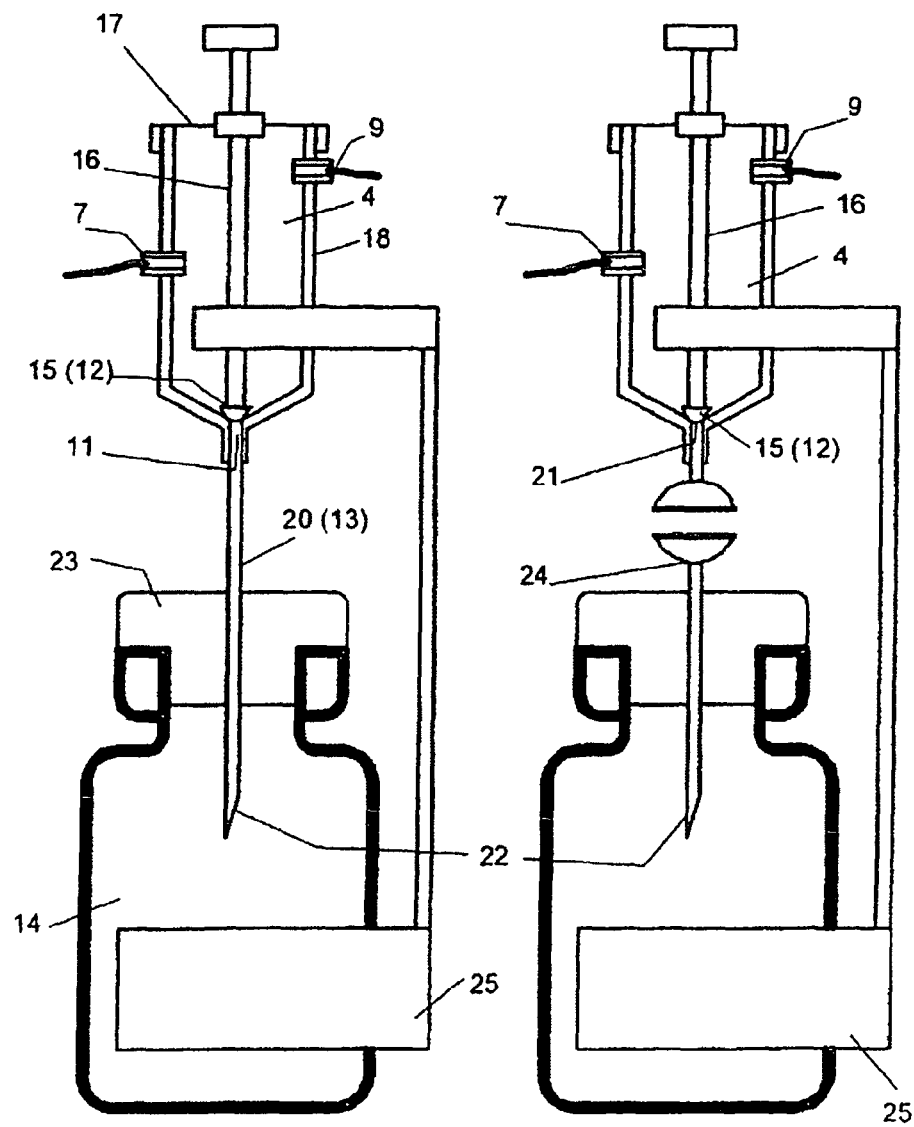

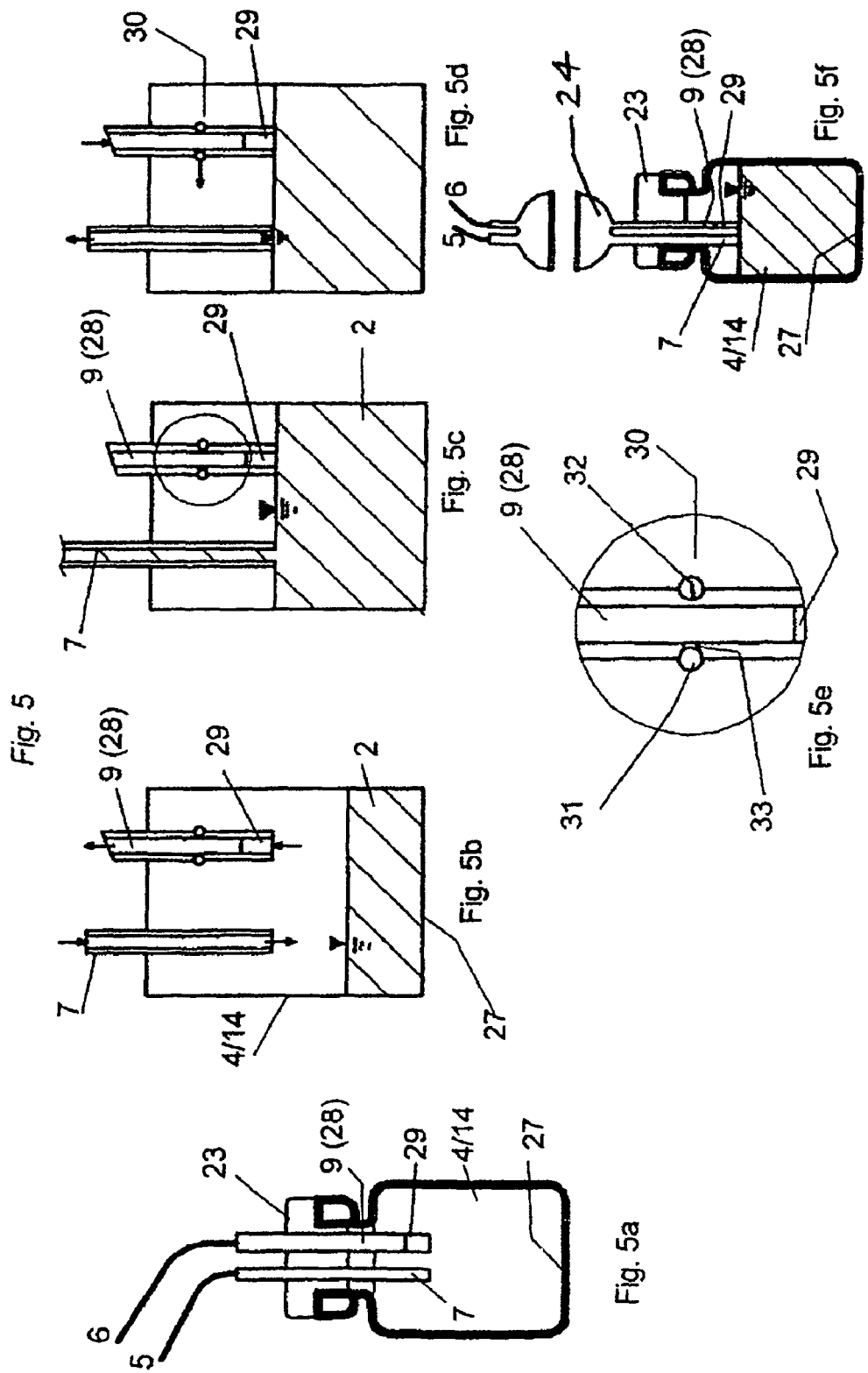

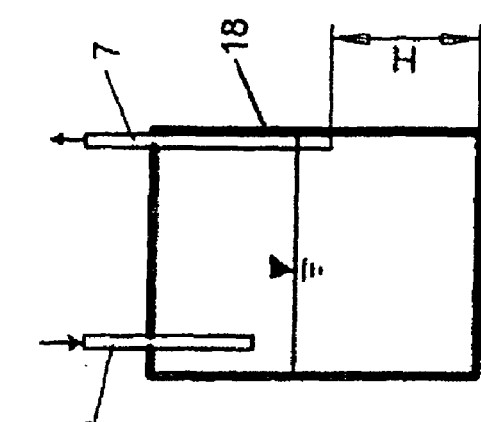
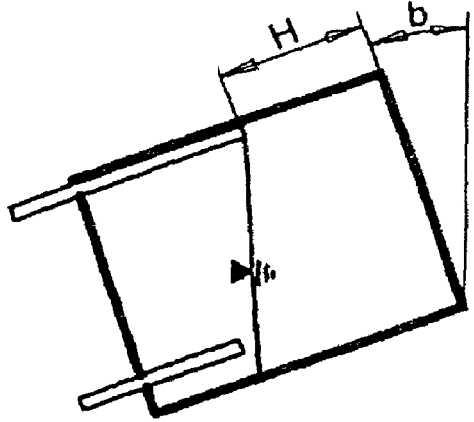
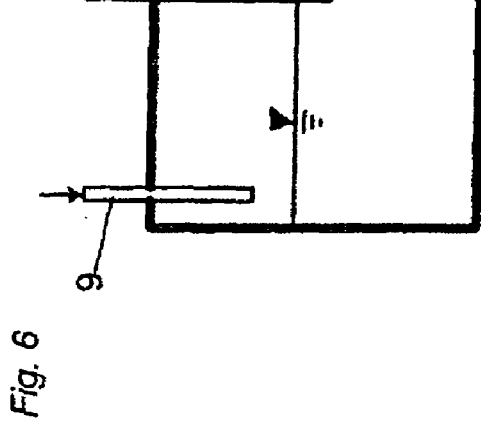
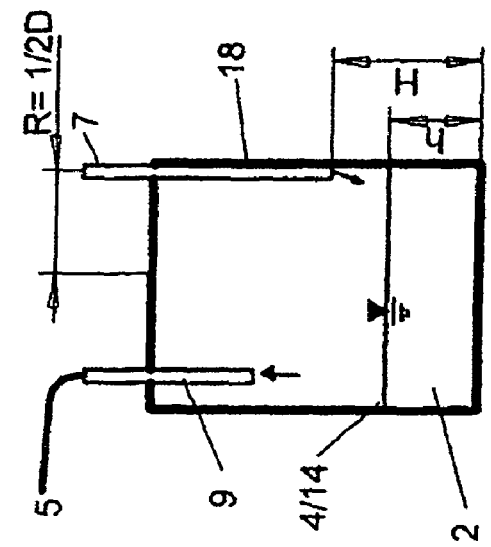
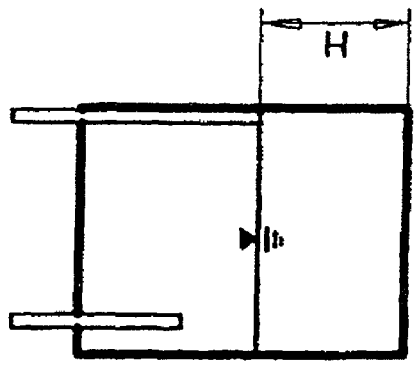

DEVICE AND METHOD FOR METERING MEDIA

The invention relates to a device and a method for metering media, in particular for sterile metering in a non-sterile environment.

In the pharmaceutical industry, devices for metering a volume of a liquid (for example a pharmacon) into a plurality of containers (for example sample vessels) are generally disposed of after the metering of a predefined total volume and the division thereof into defined individual volumes. Metering devices of this type form part of the disposable articles such as are used in the processing of materials with very high requirements placed on purity and sterility and/or in the processing of highly active substances.

Metering devices of this type are preferably composed of flexible components (bags, hoses) which form, at least prior to use, a closed system and which were sterilized prior to use. The product to be metered is touched only by clean, sterile inner surfaces of the flexible components. These flexible components are supplemented during use by solid, repeatedly used elements which act on the flexible components externally and thus do not contaminate the product, such as valves, sensors, mounts, controllers. After use, the flexible components are disposed of; the solid components are used for the next metering.

The advantages of systems of this type consist in the fact that the operations for purifying and sterilizing take place on the premises of the manufacturer of the systems during production and are thus dispensed with on the premises of the user of the systems, along with the associated, complex and expensive validation processes.

In addition, in systems of this type, no particles are dispensed from the metering device into the liquid to be metered, because no particle-generating friction occurs between movable parts of the metering device. During the processing of highly active substances (for example cytostatic agents), there is the further advantage, in addition to the advantage of the closed system, that no purification is required. The risk of carry-over and cross-contamination is ruled out in these systems.

U.S. Pat. No. 5,090,594 discloses a metering device having an upwardly open measuring cup of known volume which is arranged in a fluid chamber. The fluid to be metered is poured into the measuring cup by filling the fluid chamber up to a level above the upper, open end of the measuring cup. The fluid chamber is subsequently emptied until the fluid level drops below the upper end of the measuring cup. A volume of the fluid corresponding to the measuring cup volume is dispensed into a collection container which is connected to the measuring cup by a drain line.

EP 0 745 832 B1 discloses a metering device in which partial volumes are formed from a total volume by level-monitored and valve-controlled filling and emptying of a perpendicular, transparent tube or hose portion. The lower end of the dosing tube is selectively connected via two valves to the total volume of the liquid in a bag or to the outlet of the dosing tube. The upper end of the dosing tube is connected to the air volume in the bag above the total volume of the liquid.

During filling up to a maximum level in the tube, which is detected by a sensor, the tube is connected to the store of liquid to be metered. During emptying, this connection is closed and, after opening of an outlet valve, the liquid runs, until a detected lowest level in the tube or hose portion is reached, into the container to be filled. The sensors used are light barriers which shine through the dosing and conveying hoses and thus detect the level of the liquid influencing the beam. The filling volume is determined by the tube diameter and the difference in the heights of the detected highest and lowest level of the liquid. For a metering device, at least two sensors and two valves are required. High time requirements are placed both on the sensors and on the valves: they have to be fast and operate stably over time. The filling volume is adjusted by displacing the light barriers for one of the levels on the dosing tube.

U.S. Pat. No. 7,104,422 B2 discloses a disposable metering device which differs from the metering device of EP 0 745 832 B1 in that a part of the dosing tube is located between the two copper plates of an electrical, current-carrying capacitor. The metering process is electronically controlled as a function of the varying electrical capacitance of the capacitor as a function of the level of the fluid between the capacitor plates. An embodiment in which one of the copper plates is located directly in the dosing tube increases the risk of contamination for the fluid and increases the manufacturing costs of the metering device which is designed as a disposable article.

Drawbacks of the aforementioned devices include the complex equipment, causing relatively high costs, and the risk of contamination during metering. Thus, the path from the outlet of the metering device into the vessel to be filled runs in the non-sterile space. Thus, if sterile metering is required, the environment from the outlet from the metering device up to the entry into the vessel must be kept sterile and particle-free; this requires additional high costs.

The invention is therefore based on the object of proposing a device for metering media which is distinguished by low equipment and staff costs, is suitable as a disposable device and can be used for the sterile metering of media in a non-sterile environment.

Furthermore, it is an object of the invention to propose a method for metering media using the device.

This object is achieved by the subject device for metering media and by the subject method for metering media. Preferred developments of the invention are defined by the subclaims.

The device according to the invention has the following components:
- at least one storage container for the media to be metered with a lower opening located in the lower part of the storage container and an upper opening located in the upper part of the storage container, wherein at least the lower opening is in communicating connection with the store of media to be metered,
- at least one measuring container which is provided with a blockable outlet for the media to be metered and equipped with an upper opening and with a lower opening which lies further therebelow and defines the measurement,
- a first communicating connection between the lower openings of the at least one storage container and measuring container,
- a second communicating connection between the upper openings of the at least one storage container and measuring container or a connection, which is impassable for the media to be metered, of the upper openings to the environment.

The device allows metering of media in a non-sterile environment, as according to the invention the metering requires no sensors which are coupled to metering valves via a control circuit. This reduces the measurement and control costs. In a preferred embodiment, the device is designed as a disposable article which can be sterilized, as a result of which costs and validation effort are minimized for the user.

Before the first filling process, the storage container is filled partly with the media to be metered, partly with air. The measuring container is empty before the first filling process. "Air" can be replaced by any other gas (mixture).

Furthermore, the device has further means for exerting at least one force on the media to be metered, so that the media to be metered can be communicated between the storage container and measuring container. The media can be communicated by the exertion of force on the storage container and/or on the first communicating and/or the second communicating connection.

In a preferred embodiment of the device, the means for exerting at least one force on the media to be metered are means for generating a pressure difference between the storage container and measuring container. The means perform particularly preferably manual or linear drive-controlled raising/lowering of the storage container. The at least one force results from the difference in height, caused by the raising or lowering, of the media levels between the storage container and measuring container. These variants of the generating of media flow allow rapid, cost-effective and simple metering of media with minimized equipment costs. The means for generating the pressure difference include in further embodiments compression of the storage container, which is possible both by machine and manually, or the acting of pumps on the first and/or second communicating connection.

Particularly preferably, the first communicating connection is an outwardly tight hose connection on which a hose pump and/or peristaltic pump acts.

Also preferably, the second communicating connection is an outwardly tight hose connection on which a hose pump and/or peristaltic pump acts.

In a preferred embodiment of the invention, a predefined volume of the media to be metered can be transferred to at least one target container via the blockable outlet.

In a particularly preferred embodiment, the blockable outlet is integrated into the measuring container. Preferably, the blockable outlet can be blocked by a valve. Particularly preferably, the blockable outlet is located in the floor of the measuring container. In this embodiment, the valve is a controllable outlet valve in the form of a plunger.

The measuring container is in this case connected to the target container via an outwardly tight connection. In a preferred embodiment, the outwardly tight connection is a hose connection which is particularly preferably made of thermoplastic polymer. The valve is in a further embodiment provided outside the measuring container and acts on the outwardly tight connection. Particularly preferably, the outwardly tight connection is a hose connection which is made of thermoplastic polymer and the valve acting on the hose connection is a hose pinch valve.

The predefined volume in the measuring container can be transferred to the target container via the outwardly tight connection by activating the valve.

Once the predefined volume has been received by the target container, the hose connection between the at least one measuring container and the at least one target container can be severed by thermal and/or mechanical action and/or by adhesive bonding, closing the measuring container and the target container. The term "closing severing" refers in this case also to an extracting of tubes from a septum.

Preferably, the measuring container is configured in such a way that the predefined volume of the media to be metered corresponds to the space between the lower opening of the measuring container and the blockable outlet.

In the device according to the invention, the media and air can be exchanged between the storage container and measuring container via the first and second connection, wherein via the first connection, as a result of the exertion of at least one force, the media to be metered can be supplied to the at least one measuring container until at least the lower opening of the measuring container is completely covered by the media to be metered and wherein via the first connection, as a result of the exertion of at least one force, the media to be metered can be returned to the at least one storage container until the lower opening of the measuring container is at least partly no longer covered by the media to be metered and wherein no media to be metered can be exchanged between the at least one storage container and the at least one measuring container in the case of a lower opening, which is covered only partly by the media to be metered, of the measuring container. If no media can be exchanged between the storage container and measuring container, the measuring container contains the predefined volume of media to be metered, which can be set precisely and reproducibly. The measuring-out of the predefined volume does not require any measuring means and control means and is determined only by the geometry of the measuring container.

The media to be metered are transferred from the storage container to the measuring container by the exertion of a pressure difference-generating force, preferably by raising the at least one storage container, wherein, once raising has been carried out, the level of the media to be metered in the at least one storage container is higher than the lower opening of the at least one measuring container.

The media to be metered are returned from the measuring container to the storage container by the exertion of a force by which a pressure difference between the storage container and measuring container can be generated. Particularly preferred is a lowering of the at least one storage container, wherein, once lowering has been carried out, the level of the media to be metered in the at least one storage container is lower than the lower opening of the at least one measuring container.

The returning of the media from the measuring container to the storage container is in this case possible only until the lower opening of the measuring container is at least partly no longer covered by the media to be metered and the predefined volume is located as a space between the lower opening of the measuring container and outlet in the measuring container.

In a preferred embodiment of the device, the at least one storage container and/or the at least one measuring container and/or the at least one target container is a flexible disposable container, so that, in addition to the minimized costs for measuring means and control means, the manufacturing costs for the measuring container, target container and storage container are reduced. Preferably, the measuring container, target container and storage container are made of flexible plastics material.

In addition to flexible measuring containers, target containers and storage containers, containers made of a dimensionally stable reusable material can also be used. Dimensionally stable reusable containers made of, for example, glass can preferably be used for metering media to be metered which interact in an undesirable manner on contact with the surface of flexible containers (for example plastics material).

The at least one storage container and/or the at least one measuring container and/or the at least one target container can preferably be sterilized.

In a further preferred embodiment, the distance from the lower opening of the measuring container to the blockable outlet and thus the amount of the predefined volume can be variably set by a height adjustment of the lower opening of the measuring container. According to the invention, this height adjustment of the lower opening of the measuring container offers the advantage that, without measuring means and control means, a single device can be used to successively measure off and dose various predefined volumes without cancelling the sterility boundary from the environment.

Particularly preferably, the lower opening is located, in this embodiment, in a flexible wall of the measuring container, wherein the distance from the lower opening to the blockable outlet can be varied by exertion of at least one force. Particularly preferably, the exertion of at least one force is an application of pressure to the wall.

In an alternative embodiment, the lower opening of the measuring container is a tube in a cover, configured partly as bellows, of the measuring container. In this case, the distance from the lower opening to the blockable outlet can be varied by applying pressure to the bellows.

Particularly preferably, the measuring container and the target container are identical. As a result of this embodiment, the manufacturing costs and the complex equipment can additionally be reduced for the device according to the invention.

In the case of a measuring container which is identical to the target container, the lower and upper opening of the measuring container are preferably tubes which can be inserted through a cover of the at least one measuring container or target container and/or can be adhesively bonded into the cover and/or can be made in one piece with the cover, wherein the spacing of the tube which is the lower opening from the floor is less than the spacing of the tube which is the upper opening.

In this embodiment, the predefined volume is the space between the lower end of the tube which is the lower opening of the measuring container and the floor of the measuring container or target container.

By tilting the measuring container or target container through a tilt angle which is positive in the anticlockwise direction, the predefined volume in the measuring container or target container can be increased in size, compared to the predefined volume at a tilt angle of 0°. By tilting the measuring container or target container through a tilt angle which is negative in the anticlockwise direction, the predefined volume can be reduced in size, compared to the predefined volume at a tilt angle of 0°. The direction of rotation of the tilt angle and the increase or reduction in size of the volume associated therewith depend on which side of the measuring container or target container the lower opening is located on.

Preferably, the tube which is set less far apart and has a smaller clear width is located coaxially in the interior of the tube which is set further apart and has a larger clear width.

Particularly preferably, the tube set less far apart and the tube set further apart are made of metal and/or of plastics material and/or are a double hose.

The lower opening of the measuring container is, in a further preferred embodiment, permeable to liquids, whereas the upper opening of the measuring container is impermeable to liquids. Preferably, the upper opening is a tube, the lower part of which is formed from a porous, gas-permeable material. Particularly preferably, the lower part of the tube is a hydrophobic gas filter. The gas filter is a level switch which, during wetting by the media to be metered, is permeable neither to the media nor to gas. Above the hydrophobic gas filter, the tube has at least one means through which gas can be supplied during wetting of the gas filter with the media to be metered.

Preferably, the at least one means is a check valve or a capillary hole, which can be formed by a laser shot, in the part of the tube that is located in the measuring container or target container.

The predefined volume is in this case defined by the space between the gas filter and the floor of the target container or measuring container.

In a further preferred embodiment, a plurality of measuring containers and/or target containers can be successively filled with n media to be metered, from the at least one storage container via at least one first connection, wherein n is a positive integer greater than one.

In this preferred embodiment, the storage container has for its part an inlet which is preferably a sterile connector or sterile plug connector. Via this inlet, it is possible to pour successively into the storage container n media to be metered, which can be split up in predefined volumes over as many measuring containers and/or target containers as desired. In a particularly preferred embodiment, the media to be metered are different from one another, so that various media to be metered can be mixed in the measuring containers and/or target containers.

Because the device according to the invention has no sensors and control means for controlling the metering process, the storage container, measuring container and target container, the first and second connection and the outwardly tight connection between the measuring container and target container can be sterilized, particularly preferably joined together as a unit prior to use of the device.

In an alternative embodiment, the predefined volume can be measured by means of a level sensor outside the measuring container, wherein the level sensor is located at a height between the upper and lower opening of the measuring container. The level sensor detects the level of the media in the measuring container or target container and is particularly preferably a laser-based optical sensor or a capacitive sensor. During filling of a large number of measuring containers or target containers, one sensor is sufficient if the sensor or the measuring container or target container, which is machined in the adjustment phase, are movable in such a way that the sensor acts on the particular measuring container or target container to be adapted or all measuring containers and target containers are level and can be filled simultaneously in accordance with the principle of the communicating tubes. If an external sensor is used, the lower opening in the measuring container or target container dips into the media to be metered, so that filling or return feeding is possible. The return feeding is possible by lowering the pressure in the storage container. The desired media level in the measuring container or target container is located between the lower and upper opening. If an external sensor is used, the predefined volume can be set by the height of the sensor.

The method according to the invention using the device according to the invention includes the following steps:

A) generating a flow of media to be metered from the storage container into the measuring container until at least the lower opening of the measuring container is completely covered by media to be metered, B) generating a flow of media to be metered from the measuring container into the storage container until the lower opening of the measuring container is at least partly no longer covered by media to be metered and a predefined volume of media to be metered is located in the measuring container, C) opening the blockable outlet, and D) transferring the predefined volume of media to be metered from the measuring container to the at least one target container, wherein steps A) and B) take place by exertion of force on the media to be metered, wherein steps A)-D) are carried out in n cycles and wherein n is a positive integer greater than or equal to one. Particularly preferably, the exertion of force generates in steps A) and B) a pressure difference between the storage container and measuring container.

In a preferred embodiment, steps C) and D) are dispensed with in the case of an identical measuring container and target container.

Particularly preferably, the exertion of force generates in steps A) and B) a pressure difference between the storage container and the measuring container.

In a preferred embodiment of the method, after step D) of the $n^{th}$ cycle, the hose connection between the measuring container and target container is severed by thermal and/or mechanical action and/or by adhesive bonding, closing the measuring container and the target container.

In a further preferred embodiment, in which the measuring container is identical to the target container, after step B) of the $n^{th}$ cycle, the first connection between the storage container and measuring container or target container is severed by thermal and/or mechanical action and/or by adhesive bonding, closing the measuring container or target container.

The method according to the invention allows sterile metering of media in a non-sterile environment. As the predefined volume of the media to be metered is determined with high precision by the geometry of the measuring container, sensors for level monitoring and volumetric feeding are not required during steps A) to D). Furthermore, the equipment costs for generating the flow of media between the storage container and measuring container are minimized, as no pumps are required for the media flow in the preferred embodiment of the method.

Before the end of step A), the storage container contains the media to be metered, which are in communicating connection with its lower opening, and air, which is in communicating connection with its upper opening. Air can in this case be replaced by any other gas.

In step A), the media to be metered are transferred from the storage container to the measuring container by raising the storage container, wherein, after the raising, the media level in the storage container is above the lower opening of the measuring container.

If, after step A), the media level in the measuring container is higher than the level of the lower opening of the measuring container, the media to be metered are in step B) returned from the measuring container to the storage container by lowering the storage container, wherein, after the lowering, the media level in the storage container is below the lower opening of the measuring container. The media are returned until the lower opening of the measuring container is at least partly no longer covered by the media. The measuring container contains a predefined volume corresponding to the space between the lower opening of the measuring container and the blockable outlet.

In step C), the blockable outlet is opened. In step D), the media to be metered are transferred to the target container via the outwardly tight connection.

According to the invention, by cyclically repeating steps A)-D) ($n \geq 1$), various media can be transferred in predefined volumes to the at least one target container; this corresponds to sterile mixing of the media. In a further embodiment, only one metering cycle (n=1) is carried out. Irrespective of the number of cycles, after step D), the target container is separated from the measuring container in a sterile manner by severing the outwardly tight connection and closed in a sterile manner. In a further embodiment of the method, irrespective of the number of cycles, after step B), the target container, which is at the same time the measuring container, is separated from the storage container in a sterile manner by severing the first container and closed in a sterile manner.

In an outwardly tight hose connection or in a first connection, which are preferably produced as thermoplastic hose connections, the connections are severed by thermal and/or mechanical action and/or bonding, particularly preferably by pinch welding or by setting of metal clamps after emptying of the hoses with roller tongs.

The device according to the invention and the method according to the invention will be described hereinafter with reference to the following FIGS. 1-10, in which:

FIGS. 1a to 1d show the device according to the invention in four metering states;

FIGS. 2a to 2c show a measuring container with an integrated, blockable outlet;

FIGS. 3a and 3b show a measuring container and target container with a sterile connection;

FIGS. 5a to 5f show a target container or measuring container, the upper opening of which has a hydrophobic gas filter and a check valve;

FIGS. 6a to 6e show a target container or measuring container which is tiltable;

Figures 4, 4A, 4B:
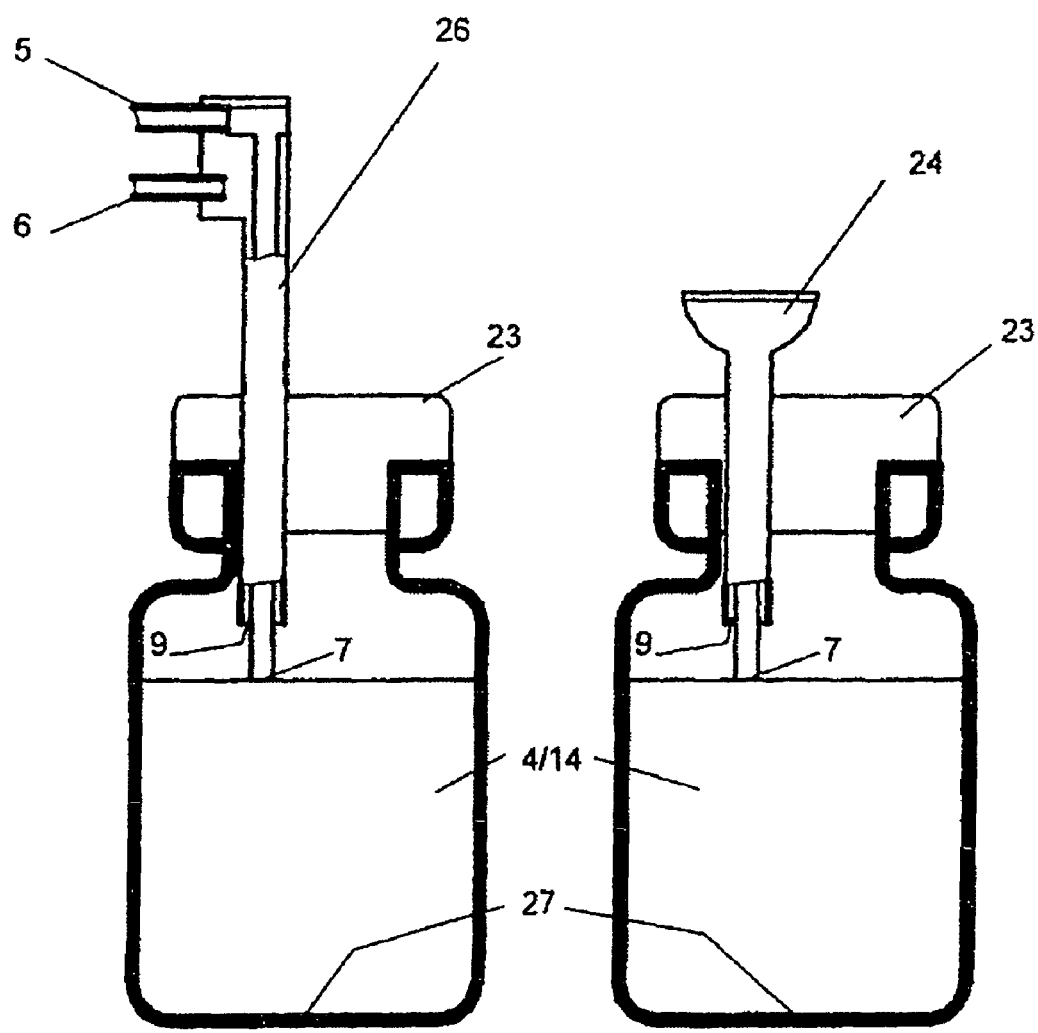
FIGS. 4a and 4b show a target container and measuring container respectively with a double line as the lower and upper opening respectively.

FIG. 1a shows a preferred embodiment of the device 1. The media 2 to be metered are preferably provided in a flexible storage container 3, i.e. in a bag, which is made of film and connected to the measuring container 4 via the first and second communicating connection 5 and 6 to form a sterile unit. Bags of this type are known as containers for infusion solutions (for example infusion or blood preservation bags). In this case, the measuring container 4 can also be a flexible bag made of film. In a further preferred embodiment, the storage container 3 and/or the measuring container 4 are dimensionally stable disposable or reusable containers made of a non-flexible material (for example plastics material, glass, metal).

The lower opening 7, which defines the measure, of the measuring container 4 is connected via the first connection 5 to the lower opening 8 of the storage container, which opening 8 is in communicating connection with the media 2 to be metered. The upper opening 9 of the measuring container 4 functions as an air outlet and leads via the second connection 6 from the upper part of the measuring container to the upper opening 10 of the storage container 3, which opening 10 is above the media 2 to be metered in the storage container 3. This upper part of the storage container 3 is filled with air.

Furthermore, the measuring container 4 has a blockable outlet 11 which is lower than the lower opening 7. The measuring container 4 is connected to the storage container 3 so as to be outwardly tight and in a sterile manner via the first and second connection 5 and 6.

In a preferred embodiment of the invention, the connections 5 and 6 are hoses.

The connection 6 between the upper opening 9 and the upper opening 10 of the storage container and measuring container may be dispensed with if the upper opening 9, as the air outlet, is provided with a sterile gas filter which is impermeable to the media or a ventilation valve which allows air to be exchanged with the surrounding environment, but does not allow any germs and particles to infiltrate.

For each filling process, a predefined volume of media 2 can be communicated between the storage container and measuring container 3 and 4 by means for exerting force on the media 2 to be metered, preferably for generating a pressure difference between the storage container and measuring container 3 and 4. The transfer of the media to be metered from the storage container 3 to the measuring container 4 is in this case possible via the first connection 5 until at least the lower opening 7 of the measuring container 4 is covered by the media to be metered. When the lower opening 7 is covered by the media to be metered, the media 2 to the metered can be transferred from the measuring container 4 to the storage container 3 until the lower opening 7 is at least partly no longer covered by the media to be metered.

The predefined volume of media to be metered is geometrically determined by the space between the lower opening 7 of the measuring container 4 and the blockable outlet 11.

According to FIG. 1a, the blockable outlet 11 is the controllable outlet valve 12. In a preferred embodiment, the controllable outlet valve 12 is a hose pinch valve. The hose pinch valve reversibly compresses the cross section of the outwardly tight, sterile connection and 13 between the measuring container and the target container 4 and 14 in a fluid-tight manner. Preferably, the connection 13 is a flexible hose. During opening of the hose pinch valve, the predefined volume of media 2 in the measuring container 4 can be metered into the target container 14 without contact with the surrounding environment. Like the storage container and measuring container 3 and 4, the target container 14 can be made of a flexible disposable material or of a non-flexible, dimensionally stable reusable material.

After opening of the outlet valve 12, the media pass from the measuring container 4 on a fluid-tight, sterile path into the target container 14.

After the end of the filling process, the target container 14 can be closed by mechanical and/or thermal and/or chemical action (for example clamping, welding, adhesive bonding) on the hose 13. The target container 14 can be separated from the measuring container 4 in a sterile manner by severing (for example cutting) the closure which has been generated by prior action on the hose 13.

FIGS. 1a to 1d show the sequence of the method according to the invention:

FIG. 1a shows the starting state of the device prior to carrying-out of step A). The storage container 3 contains the media 2 to be metered and air. The measuring container 4 is empty. This state of the measuring container 4 corresponds to the end state of the device 1, after the predefined volume has been transferred from the measuring container 4 to the target container 14.

FIG. 1b shows the filling of the measuring container 4 after raising of the storage container 3, which is a bag, until the lower opening 7 of the measuring container 4 is covered by the media 2 to be metered.

The media to be metered flow from the storage container 3 to the measuring container 4 via the first connection 5, which is a hose, wherein the media level in the storage container 3 is above the lower opening 7 of the measuring container 4. The air issues from the measuring container 4 into the storage container 3 via the second connection 6, which is a hose. The blockable outlet 11, in the form of the hose pinch valve 12, is closed. The media level in the measuring container 4 rises above the lower opening 7.

When the media in the measuring container 4 are above the lower opening 7, the storage container 3 is lowered, so that the level of the media to be metered in the storage container is lower than the lower opening 7 of the measuring container 4. In this position, the media 2 to be metered run back into the storage container 3 via the lower opening 7 via the connection 5. From the storage container 3, air passes into the measuring container 4 via the second connection 6. The liquid from the measuring container 4 runs back into the storage container 3 until the lower opening 7 is at least partly exposed and media to be metered can no longer be drawn from the measuring container via the opening 7.

FIG. 1c shows the state after passing through steps A) and B). According to FIG. 1c, the measuring container 4 contains a predefined volume which is determined by the geometrical conditions of the measuring container and is defined by the space between the upper edge of the lower opening 7 of the measuring container 4 and the blockable outlet 11.

FIG. 1d shows the sterile transfer of the media 2 to be metered from the measuring container 4 to the at least one target container 14 after passing through step C) and during the sequence of step D). When the pressure of the controllable outlet valve 12 on the preferably thermoplastic hose, which is the sterile connection 13, becomes very small, the blocking of the hose is cancelled and the media to be metered flow away from the measuring container 4 into the target container 14 via the hose. The target container 14 is subsequently separated from the measuring container 4 in a sterile manner by welding the thermoplastic hose, preferably using blood bag tongs.

FIG. 2a shows a preferred embodiment of the device according to the invention, in which the outlet 11 in the floor of the measuring container 4 can be blocked by a controllable outlet valve 12 in the measuring container 4. The blockable outlet 11 of the measuring container is closed by a plunger 15. A plunger rod 16 leads through a cover 17 of the measuring container 4 tightly outward. The cover is preferably flexible or the upper part of the measuring container 4 is deformable (not shown) by a concertina-like formation (bellows) in the direction of the plunger rod 16. The design is determined primarily by the length of the plunger rod 16 in such a way that the plunger 15 is pressed, as a result of the resilience of the cover 17 or the wall 18, onto the blockable outlet 11 which it tightly closes.

If, according to FIG. 2b on the part of the piston rod 16 that is located outside the measuring container 4, a tensile force F is exerted on the edge of the cover 17, the plunger 15 moves away from the blockable outlet 11; an outlet gap 19 is formed and the media to be metered issue from the measuring container 4 via the blockable outlet 11.

FIG. 2c shows an embodiment in which, in the closed state of the blockable outlet 11, a tensile force F prevails in the plunger rod 16.

The cover of the measuring container 4 is deformable by a pressure on the external part of the plunger rod. The tensile force thus becomes a compressive force and the controllable outlet valve 12 opens.

In the embodiments of FIGS. 2a-c, the predefined volume of media 2 to be metered is obtained from the space between the upper edge of the lower opening 7 and the blockable outlet 11 in the floor of the measuring container 4. The predefined volume of media to be metered can be transferred, after opening of the valve, to the target container 14. After the end of the filling process, the target container 14 can be severed, as described hereinbefore, from the measuring container 4 by pinch welding the outwardly tight, tubular connection 13.

FIG. 3a shows a measuring container which is connected to a target container 14 in a sterile and fluid-tight manner. The sterile connection 13, which connects the measuring container 4 to the target container 14 in a sterile manner, is a tube 20, the obtuse opening 21 of which in the floor of the measuring container 4 is closed by a plunger 15. The tip of the tube 22 can be inserted into the target container 14 in a sterile manner. Preferably, the tube 20 can be inserted into the target container 14 through a cover 23, which is a septum. As a result of the tensile force on the plunger rod 16 according to FIG. 2b, the obtuse opening 21 is exposed and the media can be transferred to the target container 14. According to FIG. 3b, after the end of the filling process, the target container 14 can be separated from the measuring container 4 in a sterile manner by pressing off and/or by severing the tube 20 so as to produce a seal. In this case, a sterile closure 24 can be generated for the target container 14. Alternatively, a sterile closure of the target container 14 can be generated by extracting the tube 20 from the cover 23, which is a septum. In order to increase stability, the measuring container and target container are fixed by the clamp 25. In a preferred embodiment, the tube 20 is a needle made of plastics material or metal.

FIG. 4a shows a further preferred embodiment of the device according to the invention, in which the measuring container and target container are identical and in which the lower opening 7 and the upper opening 9 are integrated into a double line. The double line can be inserted into the target container 14 in a sterile manner through a cover 23, which is preferably a septum, particularly preferably during the production of the cover 23 and prior to the sterilization of the device 1. The opening 7 is a tube via which the media 2 to be metered can be exchanged with the storage container 3 via the first opening 5. The opening 9 is a tube via which air can be exchanged with the storage container 3 via the second connection 6. The tube having a smaller clear width (inner line), which is opening 7, is located coaxially in the tube having a larger clear width, which is opening 9. The tube having the larger clear width is the outer line of the double line, which is formed by the space between the outer wall of the inner line and the inner wall of the outer line. The inner and outer line are, outside the measuring container 4, components of molded pieces 26 to which the connections 5 and 6, which are hoses, are fastened (for example by bonding-on).

The tube having a smaller clear width is at a smaller distance from the floor 27 of the measuring container 4 than is the tube having a larger clear width. The predefined volume of media to be metered is equal to the space between the tip of the tube, which is opening 7, and the floor 27 of the measuring container 4.

FIG. 4b shows this preferred embodiment after the end of a filling process. The parts, which are preferably made of plastic, and are particularly preferably thermoplastic, of the molded pieces 26 outside the measuring container 4 can be transferred to a sterile closure 24 by welding-off and severing, for example using welding tongs.

According to FIG. 5a, the tubes, which are openings 7 and 9, are inserted into the measuring container 4 separately through the cover 23. Particularly preferably, the tubes are made in one piece with the cover of the target vessel or can be inserted prior to sterilization through the cover 23, which is a septum.

FIG. 5a shows an embodiment of the device 1, in which the upper opening 9 is a tube 28 having a porous material 29 which is permeable to gas, but impermeable to the media to be metered. This gas-permeable material is preferably a hydrophobic gas filter membrane, particularly preferably a Teflon membrane. The measuring container 4 has, as in FIG. 4, at the same time the function of the target container 14. According to FIG. 5b, the media 2 to be metered are transferred to the target container 14 via the lower opening which is likewise a tube. At the same time, the air displaced from the target container 14 leaves the tube 28 via the gas-permeable material 29. If the level of the media 2 to be metered in the target container 14 reaches, as shown in FIG. 5c, the lower part, containing the porous, gas-permeable material 29, of the tube 28, this material 29 is wetted by the media 2 and becomes impermeable to gas. The wetting blocks the further exchange of air via the upper opening 9 and falsifies the total volume balance as a result of media 2 present in the lower opening 7. Because air can no longer be removed from the target container, nor can media 2 any longer be transferred to the target container 14.

A gas pressure is generated in the second connection 6, the gas originating from the upper part of the storage container 3. As no gas can pass through the gas filter 29 which is wetted by the media, a check valve 30 opens as a result of the generating of gas pressure according to FIG. 5d and gas passes through the check valve into the target container 14, as a result of which the media are conveyed from the first connection 5 in the direction of the storage container until the media level in the target container 14 reaches the lower end of the opening 7. Then, air passes through the media to be metered in the target container 14 and the return feeding and the metering process are completed. According to FIG. 5e, the check valve 30 consists of a resilient ring 31 which lies in a groove 32 around the tube 28 and below which a small hole 33 leads from the floor of the groove into the interior of the tube. If the pressure in the interior of the tube is greater than outside the tube, air passes outward through the hole 33 below the ring 31. The check valve 30 is located preferably in the part of the tube 28 that is located in the target container.

Instead of a check valve 30, a capillary hole or restrictor (not shown), which is formed by a laser shot in the target container-side part of the tube 28, is provided preferably above the gas-permeable material 29.

The capillary hole or restrictor has the function that, during wetting of the hydrophobic filter by the media 2 entering the target container 14, the inflow of the media is not completely broken off, but rather merely greatly slowed down. With the initiation of the return feeding, the air pressure in the second connection 6 rises and air, which returns the excess volume of media and finally also empties the first connection 5, enters the target container through the capillary hole.

The predefined volume in the target container is determined by the geometry thereof, preferably by the space between the lower part of the gas-permeable material 29 and the floor 27 of the target container 14.

The foregoing two solutions have the advantage that the filling process and the degree of filling do not have to be monitored and that the filling process is possible with high precision without losses of media to be metered in the lower opening 7 or first connection 5.

The target container is closed, preferably by pinch welding of the two tubes 7 and 9, to form a sterile closure 24, as shown in FIG. 5f.

FIG. 6a shows a target container 14, which is at the same time the measuring container, with the first and second connection 5 and 6 during the filling process. In this case, the upper and lower openings 9 and 7 are each tubes, the lower opening 7 being located adjacent to the wall 18 of the target container 14.

FIG. 6b shows the target container in the overfilled state. When this state is reached, the return feeding of the media 2 to be metered to the storage container 3 is initiated. The return feeding takes place by generating pressure in the upper opening 9 or by generating reduced pressure in the lower opening 7. Compared to FIG. 6a, the direction of flow in the first connection 5 is reversed.

In FIG. 6c, the return feeding has reached the stage at which the lower opening 7 is exposed and air passes and breaks off the return feeding.

FIG. 6d shows a target container 14, which is at the same time the measuring container, in the tilted state. The tilt angle is b, which is to be counted as being positive in the anticlockwise direction. In the case of a positive tilt angle b, as shown in FIG. 6d, there is obtained compared to FIG. 6c, in which the tilt angle b of the measuring container is equal to zero, a predefined volume which is greater by an additional volume $\Delta V$. In FIG. 6e, the tilting takes place in the other direction; b is negative. A predefined volume, which is smaller by an additional volume $\Delta V$ than at the tilt angle b=0° in FIG. 6c, is obtained. At a target container diameter D, the additional volume is $\Delta V = \Pi/8 \, D^3 \tan b$. At a target container diameter of D=15 mm and a tilt angle b of ±35°, the volume can be varied in absolute terms by approx. ±0.77 ml. The relative adjustment range depends on the total volume. The total volume is $\Delta V/V = (\Pi/8 \, D^3 \tan b)/(\Pi/4 \, D^2 H) = \frac{1}{2} \, D/H \tan b$.

Figure 7:
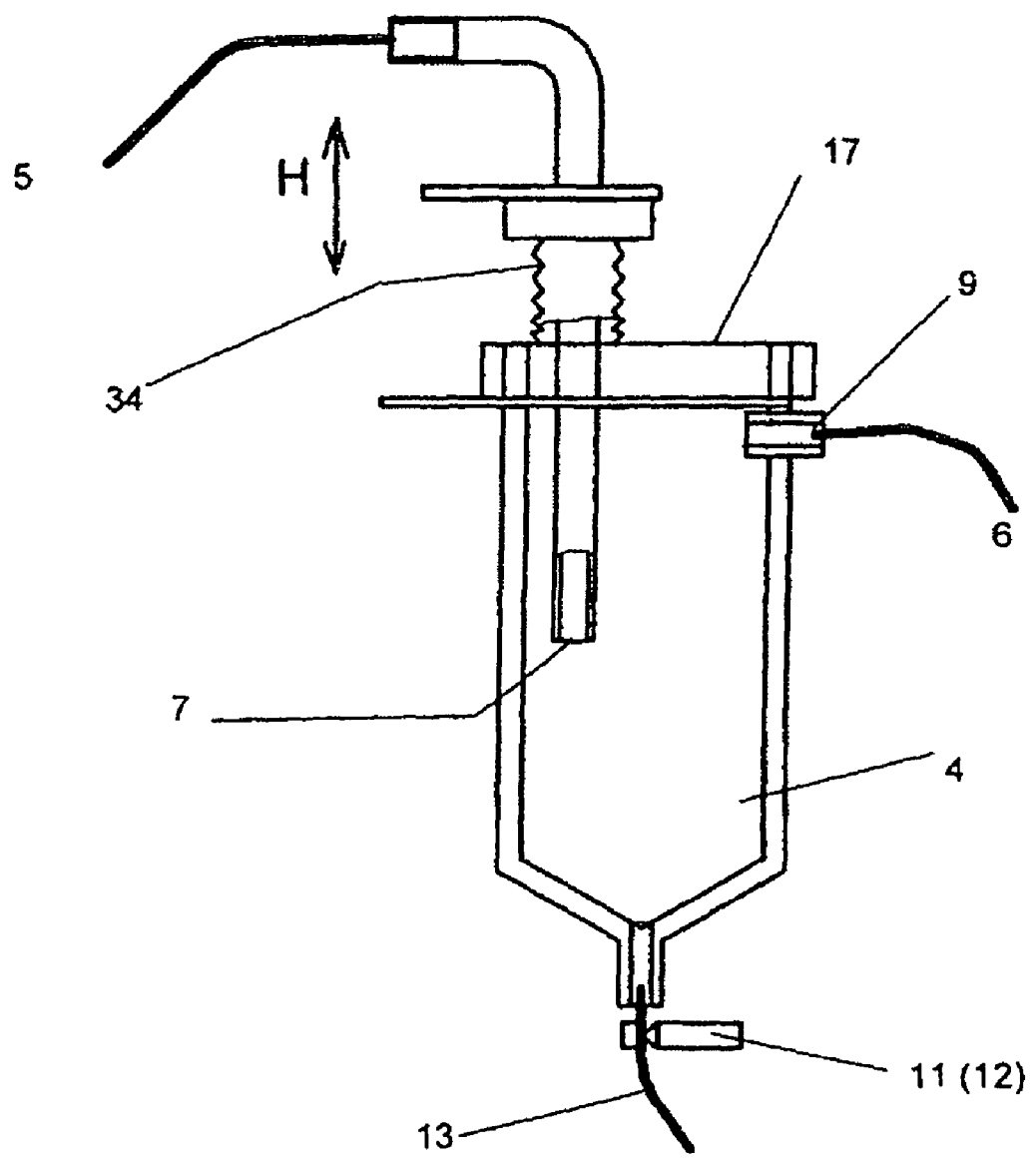
FIG. 7 shows a measuring container, the height of the lower opening of which is variable.

FIG. 7 shows an embodiment of the device 1 according to the invention, in which the predefined volume can be varied by altering the height H of the lower opening 7 in the measuring container 4. The guiding of the connection 5 through the cover 17 of the measuring container 4 is sealed here by bellows 34 allowing a linear movement. An outer mechanical adjustment means (not shown) allows the distance from the lower opening 7 to the blockable outlet 11 to be altered. If the measuring container diameter is internally equal to $d_i$, the predefined volume changes with the height H by $\Pi/4 \cdot d_i^2 \cdot H$. This linear relationship allows the mechanical adjustment means to be provided with a distance measuring system via which the predefined volume can be precisely set.

Figure 8:
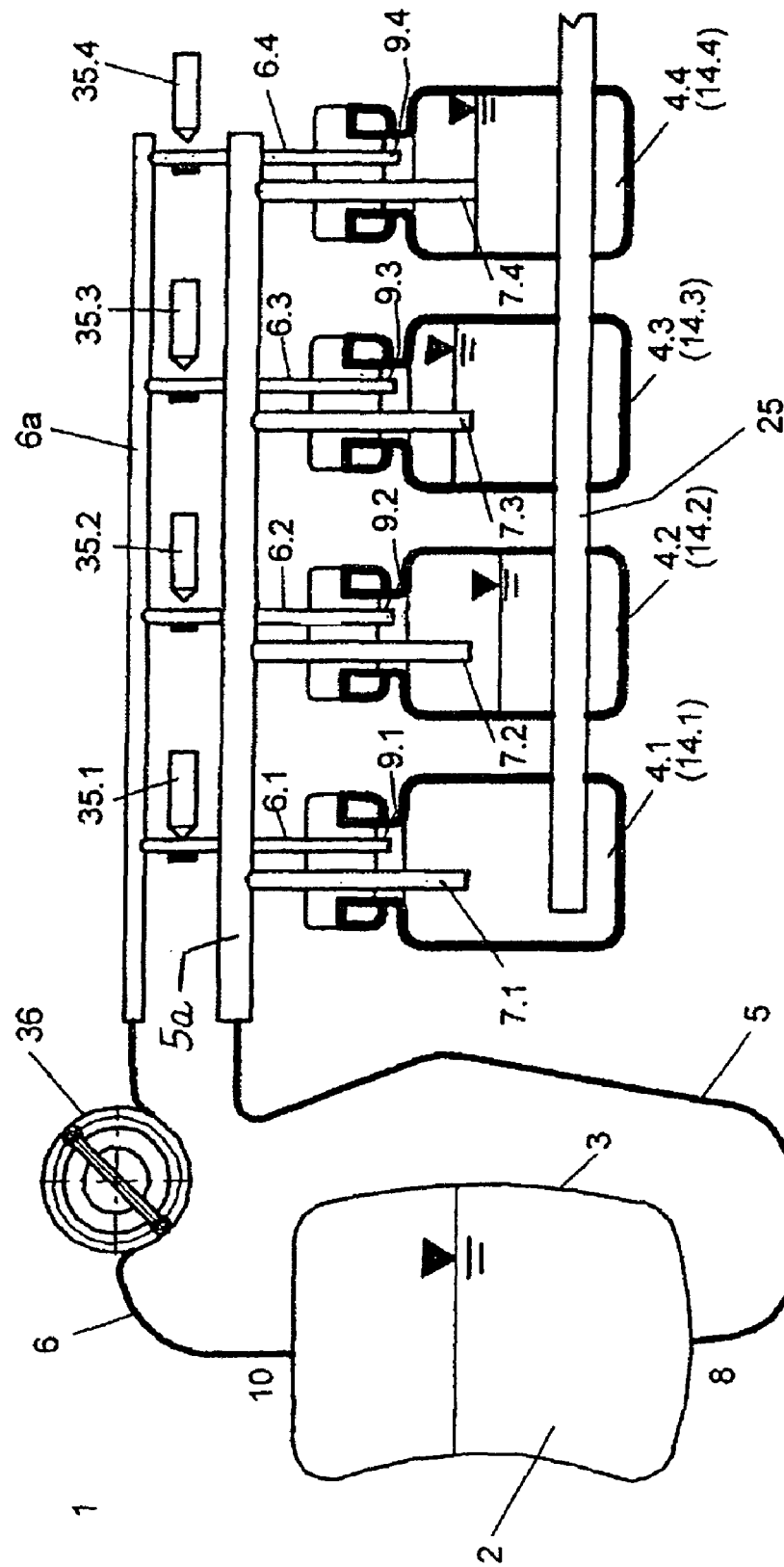
FIG. 8 shows a storage container and a plurality of target containers with a pump in the second communicating connection.

FIG. 8 shows a device 1 according to the invention for the sterile filling of a plurality of target containers in a development of FIG. 4. In this embodiment too, the target container 14 has at the same time the function of a measuring container. FIG. 8 shows four target containers 14.1-4; in principle, the number of target containers to be filled is not limited.

The media 2 to be metered are located in a flexible storage container 3. All lower openings 7.1-4 of the measuring containers and at the same time target containers 4.1-4 and 14.1-4 respectively are connected to a first collecting line 5a. The collecting line 5a, which is preferably a plastic molded piece, is connected to the lower opening 8 of the bag-shaped storage container 3, and thus to the media to be metered, via the connection 5, which is a hose.

For filling, the storage container 3 is for example raised so far that the media flow into the target containers 14.1-4 to be filled through the first communicating connection 5. The upper openings/air outlets 9.1-4 of the measuring containers and at the same time target containers 4.1-4 and 14.1-4 respectively are also drawn together in a second collecting line 6a which is preferably a plastic molded piece. The connecting line 6a connects the second connection 6, which is a hose, to the upper opening 10 of the storage container 3 and thus to the air space in the storage container. During the filling process, the air from the target containers 14.1-4 returns to the storage container 3 via the collecting line 6a and the connection 6. The entire device 1 is closed; the sterility boundary is not interrupted.

Once the media in the target containers have risen so high that the lower openings 7.1-4 are all covered with media, the storage container 3 is lowered until the media level in the storage container 3 is lower than the lower openings 7.1-4 of the target containers 14.1-4. Then, the media present above the lower openings 7.1-4 in the target containers return to the storage container 3.

If nevertheless, in one of the target containers 14.1-4, the lower opening 7 is, as a result of the falling media level, at least partly no longer covered by the media to be metered, a driving force no longer acts on the remaining target containers, because air, which moves from the target container 14 in question in the direction of the storage container 3, enters the connection 6. Therefore, valves 35.1-4 are inserted into the individual upper openings 9.1-4 of the target containers. Apart from the valve 35 on the target container 14 to be adapted, all further valves in the air lines 6.1-4 of the target vessels are closed. A pump 36, preferably a hose pump located in the second connection 6, acts in this adjustment phase on the target container 14 to be adjusted. The pump 36 acts merely via the opened valve 35 connected to the target container 14 to be adjusted. To adjust the predefined volume in the target container 14, the pump 36 conveys air from the storage container 3 into the target container 14. The air pressed into the target container 14 to be adjusted then conveys the media present above the lower opening 7 into the storage container 3 through the first collecting line 5a until the lower opening 7 is exposed and a direct connection between the lower and upper opening 7 and 9 is obtained, as a result of which the conveyance is completed owing to pressure which ceases to act. Thus, the adaptation is also completed. All that can now be conveyed is air on the path of the connection 6, the upper opening 9, one opened valve 35, the lower opening 7 and the connection 5 into the storage container 3, which air bubbles through the media 2 in the storage container 3 and returns to the air space of the storage container 3. Once the adaptation of a target container 14 to be filled has been completed, the associated valve 35 thereof is closed and the adaptation continued on the next target container by opening the corresponding valve 35.

According to FIG. 8, the illustrated target containers 14.1-4 to be filled are in the following states: 14.1 not yet filled; 14.2 not yet completely filled when the valve 35.2 is opened; 14.3 in the adjustment phase, the associated valve 35.3 is opened. The pump 36 conveys air into the target container 14.3 and presses the media out until the lower opening 7.3 is exposed; 14.4 filled and adjusted.

Figure 9:
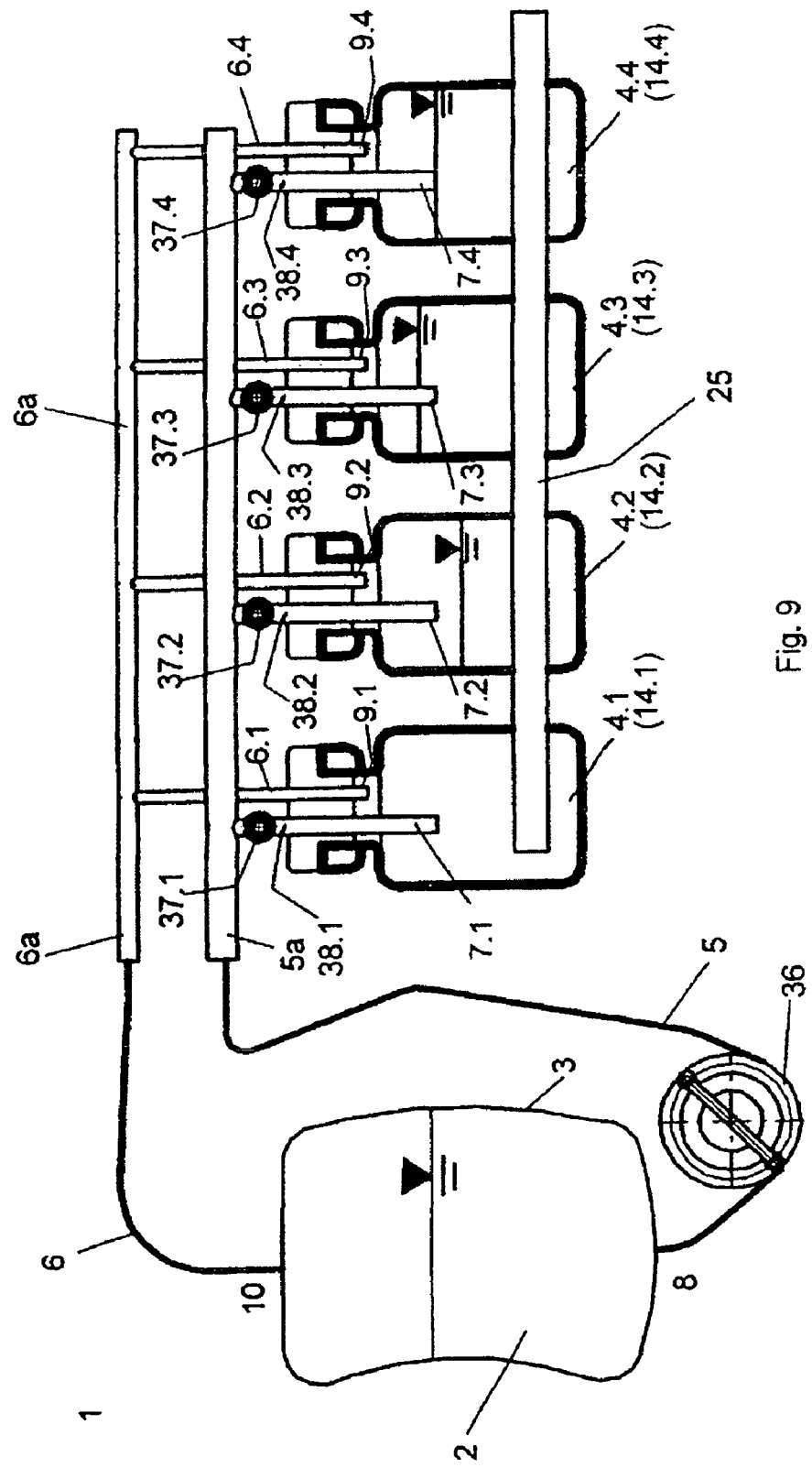
FIG. 9 shows a storage container and a plurality of target containers with a pump in the first communicating connection.

FIG. 9 shows a further, particularly preferred embodiment of the device 1 with a plurality of, in this case four, target containers 14.1-4. A reversible pump 36 to be used for the adaptation, preferably a hose pump which does not touch the media, is placed in the first connection 5. In this embodiment, valves 37.1-4, which act on the inlet lines 38.1-4 of each measuring container and at the same time target container 4.1-4 or 14.1-4, can be used. The filling process proceeds in such a way that only the valve connected to the low opening 7 of the target container 14 to be filled is opened. The pump 36 then conveys the media 2 from the storage container 3 into the target container 14 until the lower opening 7 of the target container 14 is filled by the media to be metered. Then, the pumping direction is switched over and the pump 36 again draws off media from the target container 14. The drawing-off takes place only until the lower opening 7 is exposed. Once the opening 7 is exposed, the drawing-off process and the dosing process are completed. The valve 37.1 in the inlet line 38.1 is closed again and, after opening of the valve 37.2 in the inlet line 38.2 of the next target container 14.2, the next target container is then filled.

According to FIG. 9, the target containers 14.1-4 are in the following states: 14.1 not yet filled, valve 37.1 closed; 14.2 not yet completely closed, valve 37.2 closed; 14.3 in the adjustment phase, the associated valve 37.3 is opened, the pump 36 draws media from the target container 14.3 until the lower opening 7.3 is exposed; 14.4 filled and adjusted, valve 37.4 is closed.

The target containers 14 can be filled, if the connection 5 is not inserted into the pump 36, also by raising the storage container, i.e. all target containers 14.1-4 are filled at the same time until the lower openings 7.1-4 are covered. In this case, all valves 37.1-4 are opened. After the inserting of the connection 5 into the pump 36, each target container 14.1-4 is then adjusted individually, as described for the adjustment phase.

The sterile closure of the filled target containers 14.1-4 takes place preferably as described with reference to FIG. 4.

Figure 10:
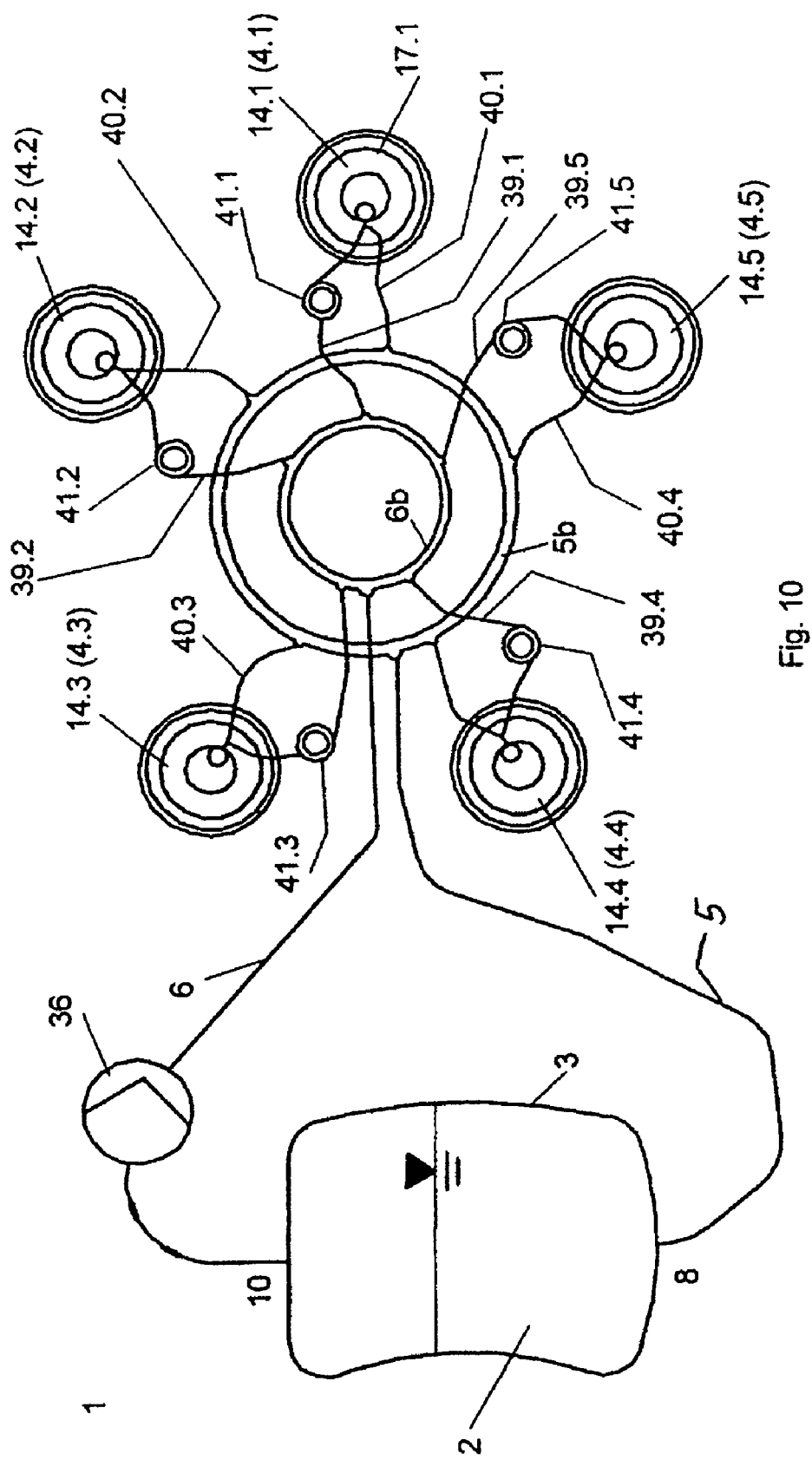
FIG. 10 is a plan view of a storage container and a plurality of target containers with annular molded pieces for distributing media and for exchanging air.

FIG. 10 is a plan view of five target containers 14.1-5 and a storage container (bag, 3). The target containers are in this case connected to one another and to the storage container 3 via annular molded pieces 5b and 6b. From the molded pieces, hoses and/or extensions 39.1-5 and 40.1-5 lead to the target containers 14.1-5. Arranged in the extensions 39.1-5, which act as air connections, are valves 41.1-5 which act in such a way that they reversibly close or release the extensions 39 of the molded pieces 6b and thus act like hose pinch valves. The construction and function correspond in all other respects to FIG. 8. The pump 36 for adjusting the predefined volume acts on the connection 6. After the filling process, the filled target containers 14.1-5 are, as shown in FIGS. 1 to 8, separated off or the extensions are extracted from the septa.

The preferred embodiments according to FIGS. 8, 9 and 10 allow the sterile metering of media 2 into any desired number of target containers 14.1-n which at the same time have the function of measuring containers 4.1-n.

In these economical embodiments, the design of a blockable outlet 11 in the target container is superfluous, because in each case an upper and lower opening 7 and 9 respectively are sufficient for metering the media 2 into the target containers 14.1-n.

LIST OF REFERENCE NUMERALS

1 Device
2 Media to be metered
3 Storage container
4 Measuring container
5 First communicating connection
5a First collecting line
5b Annular molded piece connected to the first communicating connection
6 Second communicating connection
6a Second collecting line
6b Annular molded piece connected to the second communicating connection
7 Lower opening of the measuring container
8 Lower opening of the storage container
9 Upper opening of the measuring container
10 Upper opening of the storage container
11 Blockable outlet
12 Controllable outlet valve
13 Sterile connection
14 Target container
15 Plunger
16 Plunger rod
17 Cover of the measuring container
18 Wall
19 Outlet gap
20 Tube
21 Oblique opening of the tube
22 Tip of the tube
23 Septum cover
24 Sterile closure
25 Clamp
26 Molded pieces made of thermoplastic polymer
27 Floor of the measuring container or target container
28 Tube
29 Porous, gas-permeable material
30 Check valve
31 Resilient ring
32 Groove in the tube 28
33 Hole in the groove 32
34 Bellows
35 Valve in the second collecting line 6a
36 Pump acting on the first and/or second connection 5 or 6
37 Valve in the inlet line
38 Inlet line
39 Extension or hose connected to the molded piece 6b
40 Extension or hose connected to the molded piece 5b
41 Valve in the extension or hose 39

The invention claimed is:

1. A device (1) for metering media at least comprising:
   at least one storage container (3) for the media (2) to be metered with a lower opening (8) located in the lower part of the storage container and an upper opening (10) located in the upper part of the storage container, wherein at least the lower opening (8) is in communicating connection with the store of media (2) to be metered,
   at least one measuring container (4) which is provided with a blockable outlet (11) for the media (2) to be metered and equipped with an upper opening (9) and with a lower opening (7) which lies further therebelow and defines the measurement,
   a first communicating connection (5) between the lower openings (8) and (7) of the at least one storage container and measuring container,
   a second communicating connection (6) between the upper openings (10) and (9) of the at least one storage container and measuring container or a connection, which is impassable for the media to be metered, of the upper openings to the environment.

2. The device (1) as claimed in claim 1, wherein the device (1) has means for exerting at least one force on the media (2) to be metered, so that the media can be communicated between the at least one storage container and measuring container (3) and (4).

3. The device as claimed in claim 2, wherein the means serve to generate a pressure difference between the storage container and measuring container (3) and (4), so that the media (2) to be metered can be communicated between the at least one storage container and measuring container (3) and (4).

4. The device as claimed in claim 1, wherein a predefined volume of the media (2) to be metered can be transferred to at least one target container (14) via the blockable outlet (11).

5. The device as claimed in claim 4, wherein the measuring container (4) is connected to the target container (14) via an outwardly tight connection (13).

6. The device as claimed in claim 4, wherein the blockable outlet (11) of the measuring container can be blocked by a valve (12).

7. The device as claimed in claim 6, wherein the predefined volume in the at least one measuring container (4) can be transferred to the target container (14) via the outwardly tight connection (13) by activating the valve (12).

8. The device as claimed in claim 7, wherein the outwardly tight connection (13) is a hose connection.

9. The device as claimed in claim 8, wherein the hose connection is made of a thermoplastic polymer.

10. The device as claimed in claim 9, wherein once the predefined volume has been received by the target container (14), the hose connection between the at least one measuring container (4) and the at least one target container (14) can be severed by thermal and/or mechanical action and/or by adhesive bonding, closing the measuring container (4) and the target container (14).

11. The device as claimed in claim 10, wherein a plurality of measuring containers (4.1) and/or target containers (14.1) can be successively filled with n media (2) to be metered, from the at least one storage container (3) via at least one first connection (5), and wherein n is a positive integer greater than one.

12. The device as claimed in claim 11, wherein the media (2) to be metered are different from one another.

13. The device as claimed in claim 1, wherein the predefined volume of the media (2) to be metered corresponds to the space between the lower opening (7) of the at least one measuring container (4) and the blockable outlet (11).

14. The device as claimed in claim 13, wherein the distance from the lower opening (7) to the blockable outlet (11) and thus the amount of the predefined volume can be variably set by a height adjustment of the lower opening (7).

15. The device as claimed in claim 14, wherein the lower opening (7) is located in a flexible wall (18) of the at least one measuring container (4) and wherein the distance from the lower opening (7) to the blockable outlet (11) can be varied by exertion of at least one force.

16. The device as claimed in claim 15, wherein the exertion of at least one force is an application of pressure to the wall (18) of the at least one measuring container (4).

17. The device as claimed in claim 14, wherein the lower opening (7) of the at least one measuring container (4) is a tube in a cover (17), configured partly as bellows (34), of the measuring container (4) and wherein the distance from the lower opening (7) to the blockable outlet (11) can be varied by applying pressure to the bellows (34).

18. The device as claimed in claim 13, wherein the predefined volume can be measured by means of a level sensor outside the measuring container (4) and wherein the level sensor is located at a height between the upper and lower opening (9) and (7) of the measuring container (4).

19. The device as claimed in claim 18, wherein its components can be sterilized.

20. The device as claimed in claim 1, wherein the media (2) to be metered can be communicated between the at least one storage container and measuring container (3) and (4) by means for exerting at least one force on the storage container (3) and/or on the at least one first connection (5) and/or on the at least one second connection (6).

21. The device as claimed in claim 20, wherein via the first connection (5), as a result of the exertion of at least one force, the media (2) to be metered can be supplied to the at least one measuring container (4) until at least the lower opening (7) of the measuring container (4) is completely covered by the media (2) to be metered and wherein via the first connection (5), as a result of the exertion of at least one force, the media (2) to be metered can be returned to the at least one storage container (3) until the lower opening (7) of the measuring container (4) is at least partly no longer covered by the media (2) to be metered and wherein no media (2) to be metered can be exchanged between the at least one storage container (3) and the at least one measuring container (4) in the case of a lower opening (7), which is covered only partly by the media (2) to be metered, of the measuring container (4).

22. The device as claimed in claim 21, wherein as a result of the exertion of at least one force, a pressure difference can be generated by raising the at least one storage container (3) and wherein, once raising has been carried out, the level of the media (2) to be metered in the at least one storage container (3) is higher than the lower opening (7) of the at least one measuring container (4).

23. The device as claimed in claim 21, wherein as a result of the exertion of at least one force, a pressure difference can be generated by lowering the at least one storage container (3) and wherein, once lowering has been carried out, the level of the media (2) to be metered in the at least one storage container (3) is lower than the lower opening (7) of the at least one measuring container (4).

24. The device as claimed in claim 20, wherein the exertion of at least one force is a compression of the at least one storage container (3).

25. The device as claimed in claim 20, wherein the exertion of at least one force on the first (5) and/or second connection (6) is an exertion of a hose pump and/or peristaltic pump (36) on a hose connection.

26. The device as claimed in claim 1, wherein the at least one storage container (3) and/or the at least one measuring container (4) and/or the at least one target container (14) is a flexible disposable container.

27. The device as claimed in claim 1, wherein the at least one storage container (3) and/or the at least one measuring container (4) and/or the at least one target container (14) can be sterilized.

28. The device as claimed in claim 1, wherein the blockable outlet (11) is in the floor (27) of the at least one measuring container (4).

29. The device as claimed in claim 1, wherein the measuring container (4) and the target container (14) are identical.

30. The device as claimed in claim 29, wherein the predefined volume is the space between the lower end of one of the openings (7) or (9) and the floor (27) of the target container (14).

31. The device as claimed in claim 30, wherein the lower opening (7) and the upper opening (9) are tubes which can be inserted through a cover (17, 23) of the at least one measuring container or target container (4, 14) and/or can be adhesively bonded into the cover and/or can be made in one piece with the cover, wherein the spacing of the tube which is opening (7) from the floor (27) is less than the spacing of the tube which is opening (9).

32. The device as claimed in claim 31, wherein the predefined volume can be increased in size, compared to the predefined volume at a tilt angle of 0°, by tilting the measuring container or target container (4, 14) through a tilt angle which is positive in the anticlockwise direction and wherein the predefined volume can be reduced in size, compared to the predefined volume at a tilt angle of 0°, by tilting the measuring container or target container (4, 14) through a tilt angle which is negative in the anticlockwise direction.

33. The device as claimed in claim 31, wherein the tube which is set less far apart and has a smaller clear width is located coaxially in the interior of the tube which is set further apart and has a larger clear width.

34. The device as claimed in claim 33, wherein the tube set less far apart and the tube set further apart are made of metal and/or of plastics material and/or are a double hose.

35. The device as claimed in claim 34, wherein the lower opening (7) of the measuring container (4) is permeable to liquids and the upper opening (9) of the measuring container is impermeable to liquids.

36. The device as claimed in claim 35, wherein the upper opening (9) is a tube (28), the lower part of which is formed from a porous, gas-permeable material (29).

37. The device as claimed in claim 36, wherein the porous, gas-permeable material (29) is a hydrophobic gas filter.

38. The device as claimed in claim 37, wherein the tube (28) above the hydrophobic gas filter has at least one means through which gas can be supplied to the measuring container or target container (4, 14) during wetting of the gas filter with the media to be metered.

39. The device as claimed in claim 38, wherein the at least one means is a check valve (30) or a capillary hole, which can be formed by a laser shot, in the part of the tube (28) that is located in the measuring container or target container (4, 14).

40. The device as claimed in claim 1, wherein the at least one first connection (5) between the lower opening (7) and the lower opening (8) is an outwardly tight hose connection.

41. The device as claimed in claim 1, wherein the at least one second connection (6) between the upper opening (9) and the upper opening (10) is an outwardly tight hose connection.

42. A method for metering media by means of a device (1) as claimed in claim 1, including the steps:
A) generating a flow of media (2) to be metered from the storage container (3) into the measuring container (4) until at least the lower opening (7) of the measuring container (4) is completely covered by media (2) to be metered,
B) generating a flow of media (2) to be metered from the measuring container (4) into the storage container (3) until the lower opening (7) of the measuring container (4) is at least partly no longer covered by media (2) to be metered and a predefined volume of media (2) to be metered is located in the measuring container (4),
C) opening the blockable outlet (11), and
D) transferring the predefined volume of media (2) to be metered from the measuring container (4) to the at least one target container (14),
wherein steps A) and B) take place by exertion of at least one force on the media (2) to be metered, wherein steps A)-D) are carried out in n cycles and wherein n is a positive integer greater than or equal to one.

43. The method as claimed in claim 42, wherein the exertion of at least one force generates a pressure difference between the storage container (3) and measuring container (4).

44. The method as claimed in claim 43, wherein the measuring container and the target container (4, 14) are identical and steps C) and D) are dispensed with.

45. The method as claimed in claim 42, wherein after step D) of the $n^{th}$ cycle, the hose connection (13) between the measuring container and target container (4) and (14) is severed by thermal and/or mechanical action and/or by adhesive bonding, closing the measuring container (4) and the target container (14).

46. The method as claimed in claim 42, wherein after step B) of the $n^{th}$ cycle, the first connection (5) between the storage container (3) and measuring container or target container (4, 14) is severed by thermal and/or mechanical action and/or by adhesive bonding, closing the measuring container or the target container (4, 14).

* * * * *